United States Patent Office 3,102,119
Patented Aug. 27, 1963

3,102,119
2 AND/OR 16 - AMINOMETHYLENE - 13,17 - SECO-ANDROSTAN-13α-OL17-OIC(13-17)LACTONES
Lawrence H. Knox and Fred A. Kincl, Mexico City, Mexico, assignors, by mesne assignments, to Syntex Corporation, a corporation of Panama
No Drawing. Filed May 31, 1961, Ser. No. 113,641
14 Claims. (Cl. 260—294.3)

The present invention relates to novel cyclopentanophenanthrene compounds and to a process for the production thereof.

More particularly the present invention relates to novel 2- and/or 16-aminomethylene-13,17-secoandrostan-13α-ol-17-oic(13-17)lactone derivatives.

The novel compounds of the present invention which exhibit anti-estrogenic activity, anti-androgenic activity, inhibit the secretion of the pituitary gland, and which are muscle relaxants, tranquilizers and central nervous system depressants, are represented by the following formula:

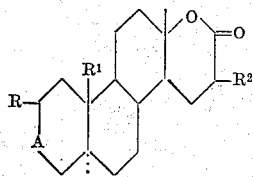

In the above formula A represents >C=O or

wherein $R^5$ represents hydrogen or a hydrocarbon carboxylic acyl group of less than 12 carbon atoms; $R^1$ represents hydrogen or methyl; one or both of R and $R^2$ represent the group

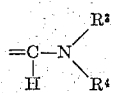

wherein $R^3$ and $R^4$ represent hydrogen, alkyl, aryl or aralkyl containing up to eight carbon atoms or $R^3$ and $R^4$ together with the nitrogen atom form a heterocyclic radical such as piperidino, morpholino, pyrrolidino or piperazino which may or may not contain alkyl substituents; and where only one of R and $R^2$ represents

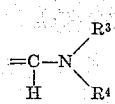

the other represents hydrogen.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

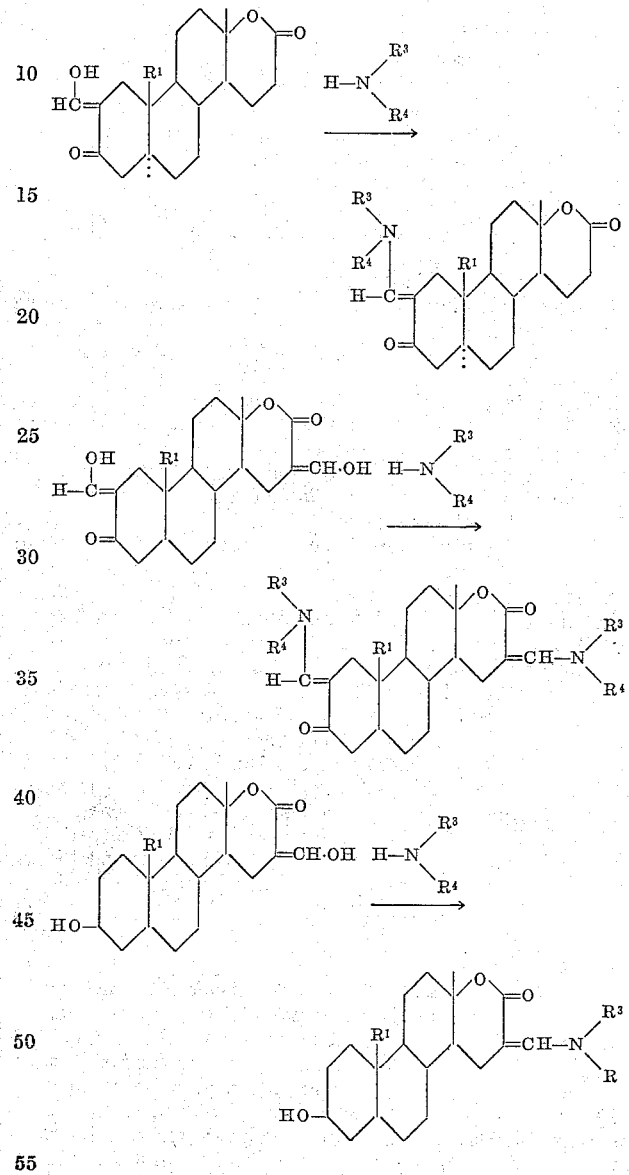

In the above formulae $R^1$, $R^3$ and $R^4$ have the same meanings as hereinbefore set forth.

In practicing the process outlined above, a 2- or 16-hydroxymethylene - 13,17 - secoandrostan-13α-ol-17-oic(13-17)-lactone or 2,16-bis(hydroxymethylene)-13,17-secoandrostan-13α-ol-17-oic (13–17)lactone derivative or the 19-nor derivatives thereof is condensed with an amine, as for example, piperidine or diethylamine, in a suitable solvent, preferably under reflux for a period of time of the order of 10 hours, thus affording the corresponding 2- or 16- aminomethylene-13,17-secoandrostan-13α-ol-17-oic (13-17)lactone or 2,16-bis(aminomethylene)-13,17-secoandroston-13α-ol-17-oic (13-17)lactone derivative or the 19-nor derivatives thereof.

When the amine used in the condensation is substituted by ammonia, the reaction takes place at room temperature in a period of time of the order of 72 hours.

Any of the above obtained derivatives having a secondary hydroxy group is conventionally acylated in pyridine with a hydrocarbon carboxylic acid anhydride of less than 12 carbon atoms as previously described, as for example acetic anhydride, thus furnishing the respective esters.

The following specific examples serve to illustrate but are not intended to limit the scope of the present invention:

Example I

A mixture of 5.0 g. of dihydroallotestololactone, 200 ml. of dry thiophene-free benzene, 15 ml. of ethyl formate, and 5.0 g. of sodium methoxide was stirred at room temperature for 5 hours. The precipitated sodium salt was collected, washed with benzene, and the air dried salt hydrolyzed by stirring for one hour with 3 N hydrochloric acid. The crude product amounted to 5.10 g., M.P. 230–233°. Recrystallization from acetone yielded 2,16-bis - hydroxymethylene-13,17-secoandrostan-13α-ol-3-one-17-oic (13-17)lactone.

1 g. of this steroid was suspended in 50 cc. of benzene, 2 cc. of piperidine was added and the mixture was refluxed for 10 hours. The solvent was slowly distilled during the reaction. At the end of the reaction period, the remainder of solvent was distilled off, the residue dissolved in ether, the solution successively washed with 1% hydrochloric acid solution, water, aqueous sodium bicarbonate solution, water, dried over sodium sulfate and evaporated to dryness. Crystallization from acetone-hexane afforded 2,16-bis-piperidinomethylene-13,17-seco-androstan-13α-ol-3-one-17-oic (13-17)lactone.

By treatment with piperidine following the above procedure of 2-hydroxymethylene-13,17-secoandrostan-13α-ol-3-one-17-oic (13-17)lactone (Kincl and Ringold, U.S. patent application Serial No. 10,554, filed February 24, 1960), 2-hydroxymethylene-13,17-seco-19-nor-androstan-13α-ol-3-one-17-oic (13-17)lactone (Kincl and Ringold, U.S. patent application Serial No. 13,426, filed March 8, 1960) and 16-hydroxymethylene-13,17-secoandrostane-3β,13α-diol-17-oic (13-17)lactone (Kincl and Ringold, U.S. patent application Serial No. 38,765, filed June 27,1960) there were correspondingly obtained: 2-piperidinomethylene - 13,17 - secoandrostan-13α-ol-3-one-17-oic (13-17)lactone, 2-piperidinomethylene-13,17-seco-19-nor-androstan-13α-ol-3-one-17-oic (13-17)lactone and 16-piperidinomethylene - 13,17 - secoandrostane-3β,13α-diol-17-oic (13-17)lactone.

Example II

A mixture of 5 g. of dihydro-19-nor-allotestololactone (Kincl and Ringold, U.S. patent application Serial No. 13,426), 200 ml. of dry thiophene free-benzene, 15 ml. of ethyl formate and 5 g. of sodium methoxide was stirred at room temperature for 5 hours. The precipitated sodium salt was collected, washed with benzene and the air-dried salt hydrolyzed by stirring for one hour with 3 N hydrochloric acid. The solid was filtered off, washed with water and dried. Recrystallization from acetone afforded 2,16-bis-hydroxymethylene-13,17-seco-19-nor-androstan-13α-ol-3-one-17-oic (13-17)lactone. 2 g. of this compound were stirred for 72 hours in 100 cc. of a saturated solution of ammonia in dioxane. The solvent was evaporated and the residue was recrystallized from acetone-hexane, furnishing 2,16-bis-aminomethylene-13,17-seco-19-nor-androstan-13α-ol-3-one-17-oic (13-17)lactone.

When applying this last technique to the starting compounds listed below there were obtained the corresponding products indicated:

| Starting compound | Product |
|---|---|
| 2,16-bis-hydroxymethylene-13,17-secoandrostan-13α-ol-3-one-17-oic(13-17)lactone. | 2,16-bis-aminomethylene-13,17-secoandrostan-13α-ol-3-one-17-oic(13-17)lactone. |
| 2-hydroxymethylene-13,17-secoandrostan-13α-ol-3-one-17-oic (13-17)lactone. | 2-aminomethylene-13,17-secoandrostan-13α-ol-3-one-17-oic (13-17)lactone. |
| 2-hydroxymethylene-13,17-seco-19-nor-androstan-13α-ol-3-one-17-oic(13-17)lactone. | 2-aminomethylene-13,17-seco-19-nor-androstan-13α-ol-3-one-17-oic(13-17)lactone. |
| 16-hydroxymethylene-13,17-secoandrostane-3β,13α-diol-17-oic (13-17)lactone. | 16-aminomethylene-13,17-secoandrostane-3β,13α-diol-17-oic (13-17) lactone. |

Example III

A mixture of 1 g. of 2,16-bis-hydroxymethylene-13,17-secoandrostan-13α-ol-3-one-17-oic (13-17)lactone, 2 cc. of diethylamine and 50 c. of benzene was refluxed for 16 hours with an adapter to separate the water as it forms. The resulting solution was evaporated to dryness and the residue recrystallized from acetone-hexane affording 2,16 - bis - N,N-diethylaminomethylene-13,17-secoandrostan-13α-ol-3-one-17-oic (13-17)lactone.

Following the above technique were treated the compounds listed below with the indicated amine, thus furnishing the corresponding products disclosed hereafter:

| Starting compound | Amine | Product |
|---|---|---|
| 2,16-bis-hydroxymethylene-13,17-seco-19-nor-androstan-17-oic (13-17) lactone. | diethylamine | 2,16-bis-N,N-diethylamino-methylene-13,17-seco-19-nor-androstan-13α-ol-3-one-17-oic (13-17) lactone. |
| Do | N-methyl-aniline. | 2,16-bis-(N-methyl-N-phenylamino) methylene-13,17-seco-19-nor-androstan-13α-ol-3-one-17-oic (13-17) lactone. |
| 2-hydroxymethylene-13,17-secoandrostan-13α-ol-3-one-17-oic (13-17) lactone. | diethylamine | 2-N,N-diethylamino-methylene-13,17-secoandrostan-13β-ol-3-one-17-oic (13-17) lactone. |
| Do | N-methyl-aniline. | 2-(N-methyl-N-phenylamino)-methylene-13,17-seco-androstan-13α-ol-3-one-17-oic (13-17) lactone. |
| 2-hydroxymethylene-13,17-seco-19-nor-androstan-13α-ol-3-one-17-oic (13-17) lactone. | diethylamine | 2-N,N-diethylamino-methylene-13,17-seco-19-nor-androstan-13α-ol-3-one-17-oic (13-17) lactone. |
| Do | N-methyl-aniline. | 2-(N-methyl,N-phenylamino)-methylene-13,17-seco-19-nor-androstan-13α-ol-3-one-17-oic (13-17) lactone. |
| 16-hydroxymethylene-13,17-secoandrostane-3β,13α-diol-17-oic (13-17)lactone. | diethylamine | 16-N,N-diethylamino-methylene-13,17-secoandrostane-3β,13α-diol-17-oic (13-17) lactone. |
| Do | N-methyl-aniline. | 16-(N-methyl-N-phenylamino)-methylene-13,17-secoandrostane-3β,13α-diol-17-oic (13-17) lactone. |

Example IV

A mixture of 1 g. of 16-piperidinomethylene-13,17-secoandrostane-3β,13α-diol-17-oic(13-17)lactone, 2 cc. of acetic anhydride and 25 cc. of pyridine was kept overnight at room temperature. Then it was poured into water and the resulting precipitate filtered off, washed with water and dried. Recrystallization from acetone-hexane afforded the 3-acetate of 16-piperidinomethylene-13,17-secoandrostane-3β,13α-diol-17-oic(13-17)lactone.

Following the same procedure, there were treated the starting compounds listed below, thus affording the corresponding products hereafter set forth.

| Starting compound | Product |
|---|---|
| 16-aminomethylene-13,17-seco-androstane-3β,13α-diol-17-oic (13-17) lactone. | 3-acetate of 16-N-acetamino-methylene-13,17-secoandrostane-3β,13α-diol-17-oic (13-17) lactone. |
| 16-piperidinomethylene-13,17-secoandrostane-3β,13α-diol-17-oic (13-17) lactone. | 3-acetate of 16-piperidinomethylene-13,17-secoandrostane-3β,13α-diol-17-oic (13-17) lactone. |
| 16-N,N-diethylaminomethylene-13,17-secoandrostane-3β,13α-diol-17-oic (13-17) lactone. | 3-acetate of 16-N,N-diethylamino-methylene-13,17-secoandrostane-3β,13α-diol-17-oic (13-17) lactone. |
| 16-(N-methyl-N-phenylamino)-methylene-13,17-secoandrostane-3β,13α-diol-17-oic (13-17) lactone. | 3-acetate of 16-(N-methyl-N-phenylamino)-methylene-13,17-secoandrostane-3β,13α-diol-17-oic (13-17) lactone. |

By the same method, but substituting the acetic anhydride by propionic anhydride, caproic anhydride, cyclopentylpropionic anhydride or benzoyl chloride, there were obtained the corresponding propionates, caproates, cyclopentylpropionates and benzoates of the above starting compounds.

Example V

By following the method of Example I except that the piperidine was substituted by pyrrolidine there was obtained the corresponding 2,16-bis-pyrrolidinomethylene-13,17 - secoandrostan-13α-ol-3-one-17-oic(13-17)lactone; 2-pyrrolidinomethylene - 13,17 - secoandrostan-13α-ol-3-one - 17 - oic(13-17)lactone; 2 - pyrrolidinomethylene - 13,17 - seco - 19 - nor - androstan - 13α - ol - 3 - one - 17-oic(13-17)lactone and 16 - pyrrolidinomethylene - 13,17-secoandrostane-3β,13α-diol-17-oic(13-17)lactone.

In a similar manner the pyrrolidine was substituted by piperazine or morpholine and there were formed the corresponding piperazinomethylene or morpholinomethylene derivatives of the foregoing compounds.

We claim:
1. A compound of the following formula:

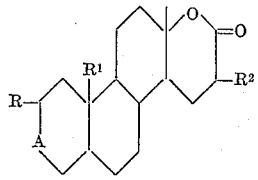

wherein A is selected from the group consisting of >C=O and

wherein $R^5$ is selected from the group consisting of hydrogen and hydrocarbon carboxylic acyl of less than 12 carbon atoms; R and $R^2$ are each selected from the group consisting of two hydrogen atoms and the grouping

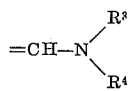

wherein $R^3$ and $R^4$ are selected from the group consisting of hydrogen, lower alkyl, aryl, and aralkyl of up to 8 carbon atoms and $R^3$ and $R^4$ together with the nitrogen form a heterocyclic ring selected from the group consisting of piperidine, morpholine, piperazine and pyrrolidine and at least one of R and $R^2$ is

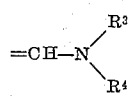

and $R^1$ is selected from the group consisting of hydrogen and methyl.

2. 2,16 - bis - piperidinomethylene - 13,17 - secoandrostan-13α-ol-3-one-17-oic(13-17)lactone.

3. 2-piperidinomethylene - 13,17 - seco-19-nor-androstan-13α-ol-3-one-17-oic(13-17)lactone.

4. 16 - piperidinomethylene - 13,17 - secoandrostane-3β,13α-diol-17-oic(13-17)lactone.

5. The 3-hydrocarbon carboxylic esters of up to 12 carbon atoms of 16-piperidinomethylene-13,17-secoandrostane-3β,13α-diol-17-oic(13-17)lactone.

6. 2,16 - bis-aminomethylene-13,17-seco-19-nor-androstan-13α-ol-3-one-17-oic(13-17)lactone.

7. 2-aminomethylene - 13,17 - secoandrostan-13α-ol-3-one-17-oic(13-17)lactone.

8. 16 - aminomethylene - 13,17-secoandrostane-3β,13α-diol-17-oic(13-17)lactone.

9. The 3-acetate of 16-acetaminomethylene-13,17-seco-androstane-3β,13α-diol-17-oic(13-17)lactone.

10. The process of claim 14 wherein the amine is piperidine and the solvent is benzene.

11. The process of claim 14 wherein the amine is diethylamine and the solvent is benzene.

12. The process of claim 14 wherein the amine is methyl-aniline and the solvent is benzene.

13. The process of claim 14 wherein the amine is substituted by ammonia and the solvent is dioxane.

14. A process for the production of a compound of the following formula:

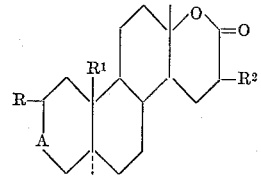

wherein A is selected from the group consisting of >C=O and

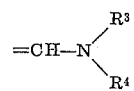

wherein $R^5$ is selected from the group consisting of hydrogen and hydrocarbon carboxylic acyl of less than 12 carbon atoms; R and $R^2$ are each selected from the group consisting of two hydrogen atoms and the grouping

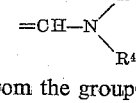

wherein $R^3$ and $R^4$ are selected from the group consisting of hydrogen, lower alkyl, aryl, and aralkyl of up to 8 carbon atoms and $R^3$ and $R^4$ together with the nitrogen form a heterocyclic ring selected from the group consisting of piperidine, morpholine, piperazine and pyrrolidine and at least one of R and $R^2$ is

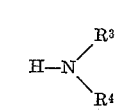

and $R_1$ is selected from the group consisting of hydrogen and methyl, which comprises condensing the corresponding hydroxy-methylene derivative with an amine of the following formula:

$$H-N\begin{matrix}R^3\\R^4\end{matrix}$$

wherein $R^3$ and $R^4$ have the same meaning as set forth above in a suitable organic solvent selected from the group consisting of benzene and dioxane.

No references cited.